US005178190A

United States Patent [19]

Mettner

[11] Patent Number: 5,178,190

[45] Date of Patent: Jan. 12, 1993

[54] MICROVALVE

[75] Inventor: Michael Mettner, Ludwigsburg, Fed. Rep. of Germany

[73] Assignee: Robert Bosch GmbH, Stuttgart, Fed. Rep. of Germany

[21] Appl. No.: 800,491

[22] Filed: Nov. 29, 1991

[30] Foreign Application Priority Data

Dec. 22, 1990 [DE] Fed. Rep. of Germany ....... 4041579

[51] Int. Cl.[5] ............ F16K 11/065

[52] U.S. Cl. ............ 137/625.65; 251/129.01; 251/368

[58] Field of Search ............ 137/625.65, 625.25; 251/282, 368, 129.01; 357/55

[56] References Cited

U.S. PATENT DOCUMENTS

| | | | |
|---|---|---|---|
| 4,325,412 | 4/1982 | Hayner | 251/282 X |
| 4,581,624 | 4/1986 | O'Connor . | |
| 5,054,522 | 10/1991 | Kowanz et al. | 251/129.01 X |

OTHER PUBLICATIONS

"MICROMECHANIK", by Anton Heuberger, pp. 236-265, and attached translations of figure legends.

*Primary Examiner*—Arnold Rosenthal

*Attorney, Agent, or Firm*—Frishauf, Holtz, Goodman & Woodward

[57] ABSTRACT

A microvalve with a multi-layer structure for regulating or controlling fluid flows is proposed. In a first layer at least one feed connector, a first return connector, at least two working connectors and at least a second return connector are structured. The microvalve has a second layer which is connected via an at least first structured intermediate layer with the first layer. Means are structured in the second layer which are electrostatically operable and by means of which the degree of opening of the at least one feed connector can be changed. The microvalve is constructed symmetrically in respect to the second layer, in that a third layer, structured mirror-reversed in respect to the first layer, is applied to the second layer via a further structured intermediate layer. Thus the third layer has at least two further working connectors, at least one further feed connector and at least two further return connectors, where each two of the connectors located opposite each other in the first layer and the third layer form a pair. At least one flat slider with at least two flow-through openings is structured in the second layer to form an electrostatically operable means.

13 Claims, 3 Drawing Sheets

MICROVALVE

Cross-Reference to Related Patents and Applications, Assigned to the Assignee of the Present Invention, the Disclosures of Which are Hereby Incorporated by Reference:

U.S. Pat. Nos. 4,522,067 and 4,620,365, BURGER.

U.S. Pat. No. 5,005,414 HOLLAND et al. (= DE-OS 38 14 950)

U.S. Pat. No. 4,955,234, MAREK, issued Sep.. 11, 1990 = DE 38 14 952 (Assignee docket R. 21 760);

U.S.S.N. 07/ 631,623, MAREK, BANTIEN, HAACK & WARTH, corresponding to German Patent DE-PS 40 00 903 of 9 Aug. 1990, U.S.S.N. 07/ 716,817, MAREK, filed Jun. 17, 1991, corresponding to German P 40 22 464.3, filed Jul. 14, 1990;

German Patent Disclosure DE 36 09 841, filed Mar. 22, 1986, and Published International Application WO 87-05569, HEINTZ et al;

ENGELSDORF & METTNER, German Patent Disclosure DE-OS 39 19 876, publ. Dec. 20, 1990, and corresponding PCT/DE90/00366, publ. Dec. 27, 1990 as WO 90-15933;

U.S.S.N. 07/ 566,997, METTNER et al., filed Aug. 13, 1990, and corresponding PCT/EP90/01297, publ. as WO 91-02169;

German Patent Disclosure DE 40 16 472.1 and corresponding U.S.S.N. 07/ 701,880, BANTIEN, filed May 17, 1991;

German Patent Disclosure DE 40 16 471.3 and corresponding U.S.S.N. 07/ 701,781, BANTIEN, filed May 17, 1991;

German Patent Application P 40 22 495.3, filed July 1990;

German Patent Disclosure DE 40 28 402.6 and corresponding U.S.S.N. 07/ 750,893, MAREK & SEIPLER, filed Aug. 26, 1991;

German Patent Disclosure DE 40 41 582.1 and corresponding U.S.S.N. 07/ 800,976, ROTHLEY, WOLF & ZABLER, filed Dec. 2, 1991;

Cross-Reference To Other Related Patent

U.S. Pat. No. 4,581,624, O'CONNER/ALLIED, 8 Apr. 1986, entitled MICROMINIATURE SEMICONDUCTOR VALVE;

U.S. Pat. No. 4,836,023, OIKAWA/YAZAKI CORP., 6 Jun. 1989, entitled VIBRATIONAL ANGULAR RATE SENSOR;

U.S. Pat. Nos. 4,549,926 and 4,578,142, CORBOY JR. et al/RCA;

U.S. Pat. No. 4,585,513, GALE et al/RCA, issued 29 Apr. 1986;

U.S. Pat. No. 4,658,495, FLATLEY & IPRI/RCA, issued 21 Apr. 1987;

U.S. Pat. No. 4,698,132, DENNIS/RCA, issued 6 Oct. 1987;

German Patent DE-PS 36 25 411, SEIDEL, 11 Nov. 1988, assigned to Messerschmidt-Bölkow-Blohm GmbH.

Cross-Reference to Related Literature

Walter Kern, "Chemical Etching of Silicon, Germanium, Gallium Arsenide, and Gallium Phosphide", RCA REVIEW, June 1978, Vol. 39, pp. 278-308.

W.C. Tang et al., "Laterally Driven Polysilicon Resonant Microstructures", Vol. 20, Sensors & Actuators, pages 53-59, IEEE 1989.

FIELD OF THE INVENTION

The invention relates to a microvalve with a multilayer structure for regulating or controlling fluid flows with a first layer, in which at least one feed connector and at least a first return connector is structured, and with a second layer which is connected via an at least first structured intermediate layer with the first layer, where means are structured in the second layer which are electrostatically operable, because of which the degree of opening of the at least one feed connector can be changed.

BACKGROUND

A microvalve is already known from O'CONNER U.S. Pat. No. 4,581,624 and British Patent Disclosure GB 21 55 152-A. This microvalve is constructed in accordance with multi-layer structure technology known from the semiconductor technology. This micro-mechanical valve essentially has three layers, of which one is a support layer of silicon in which an inlet port and an outlet port as well as a valve seat are embodied. An intermediate layer follows the support layer and an outer cover layer follows the latter, these layers forming a chamber which provides the pressure medium connection between the two connectors.

In this microvalve the cover layer is also formed as a diaphragm into which a closing member, which is associated with the valve seat, is also integrated. An electrostatic operating device is additionally disposed on the diaphragm, by means of which the valve can be opened in that the closing member is displaced vertically in respect to the layer levels while the diaphragm is deformed. Closing of the valve is provided by the restoring force of the diaphragm, under the influence of which the closing member again comes to rest on the valve seat once the operating device is shut off. Thus the electrostatic operating device must overcome the force of the resilient diaphragm in addition to the pressure of the fluid present at the inlet. The construction of this microvalve, which does not compensate the pressure, requires extensive operating devices, because relatively large control forces are necessary.

THE INVENTION

The microvalve in accordance with the invention has the advantage of representing a complete $\frac{3}{2}$-way valve stage. The symmetrical structure of the layers of the microvalve in accordance with the invention is particularly simple and advantageous, because in the process of producing the individual layers there is no requirement for many different structurizations.

In this connection it is also advantageous that only the structuring of the surfaces of the layer is necessary, which can be applied in a batch process by means of lithographic structure transfer methods common in the micromechanical field to a suitable layer material, preferably silicon or glass. In this case, the valve can be produced simply by bonding the layers to each other. However, it is also possible to produce the microvalve structure in accordance with LIGA technology, where casting molds for the structures of the layers are produced by a lithographic method and the actual layers are produced in a second cast step. With this method it is also possible to produce microvalves of plastic or other materials. The methods mentioned are suitable for cost-efficient mass production.

A further advantage of the microvalve in accordance with the invention lies in that the outer layers in the form of stator levels simultaneously provide protection for the flat slider embodied in the central layer, the slider level, where the flat slider is displaceable in the layer level. An electrostatic drive, which is realized by the application of electrodes on the layer surfaces, is particularly suited as a drive for the displacement of the flat slider. The electrodes required for the drive have only a negligible effect on the geometry of the valve structure.

It is particularly advantageous to embody the flat slider in such a way that it is connected with the second layer by means of transverse beams. The transverse beams act as springs and their restoring force always returns the flat slider into a defined initial position, if the flat slider is not actively operated. It is particularly advantageous to dispose the return connectors, the working connectors and the feed connectors next to each other in such a way that in a first position of the valve, the resting position of the flat slider, the working connectors are connected with neither a feed connector nor a return connector, so that the valve is "closed". When displacing the flat slider it is then optionally possible, depending on the direction of the displacement, to connect a working connector with a feed connector, while another working connector is connected with a return connector. Displacement of the flat slider in the second layer is only possible if there is a narrow space between layer 2 and layers 1 and 3. This space can be advantageously generated if there are recesses in the intermediate layers which connect the layers 1, 2 and 3 with each other in the area of the flat slider and the transverse beams. Another advantageous possibility of the realization of the space between the flat slider and the first and third layers consists in either reducing the thickness of the flat slider on both sides or in reducing the thickness of the first and third layer in the area of the flat slider and the transverse beams. Electrostatic drive of the flat slider can be advantageously realized by electrodes applied to the top and underside of the flat slider and/or the transverse beams.

Counter-electrodes are disposed, offset in the direction of displacement, on the first and third layers across from the first electrodes. It is particularly advantageous if the disposition of the electrodes on the flat slider is symmetrical in respect to the front and back of the flat slider and the disposition of the counter-electrodes is also made symmetrical. In this case the vertical components of the forces cancel each other out when voltage is applied between the electrodes and the counter-electrodes, so that only the horizontal forces remain, which cause the displacement of the flat slider. The electrodes can be realized simply and advantageously in the form of thin metallic layers or doped silicon layers.

DRAWINGS

Figure 4A:
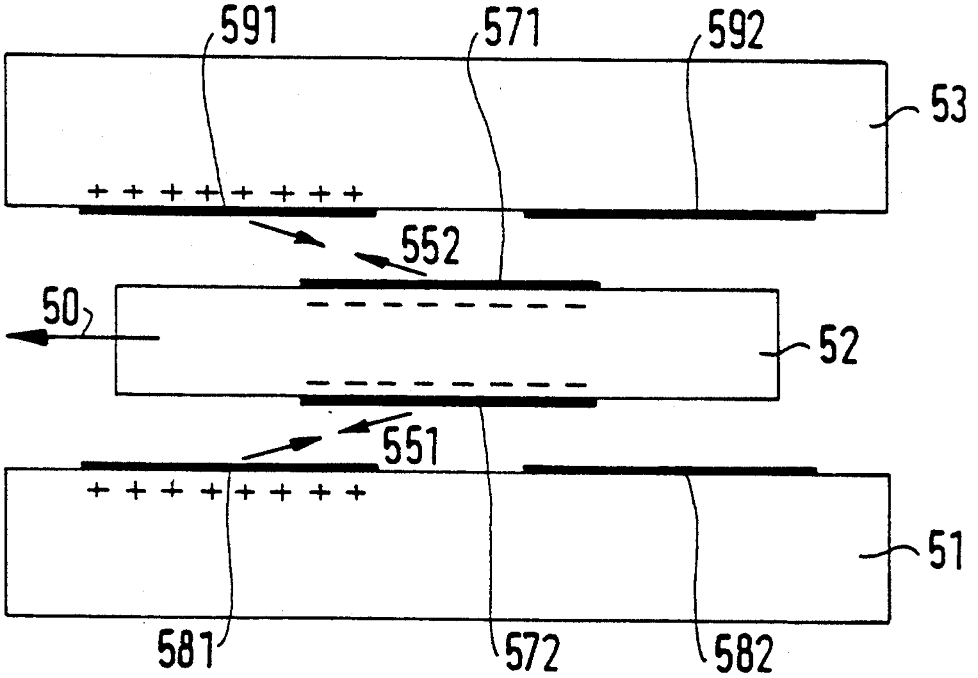

FIGS. 4*a* and *b* are schematic illustrations of electrostatic drives.

DETAILED DESCRIPTION

Figure 1:
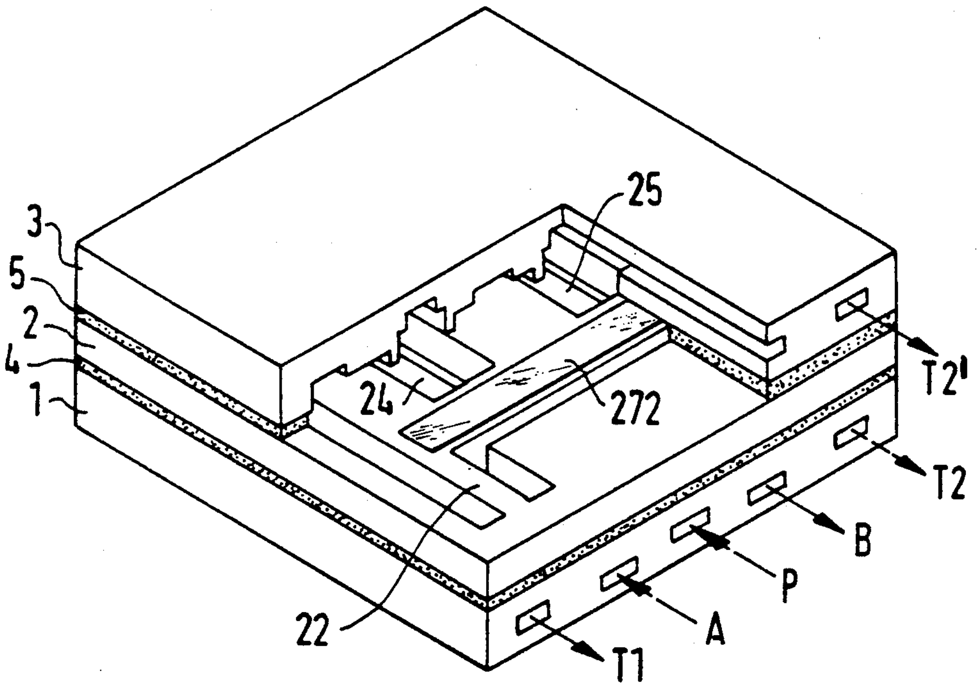
FIG. 1 is a perspective view in partial section of a microvalve.

A microvalve is shown in FIG. 1, which essentially is embodied in three layers 1, 2 and 3, which are connected with each other via intermediate layers 4 and 5. Depending on the choice of material and the design of the microvalve, the layers 1 to 5 can each be constructed in sub-layers. Silicon or glass, for example, are suitable as materials, which can be simply worked by means of the lithographic structure transfer method in a batch process and which can be connected with each other, for example via silicon oxide layers, by means of bonding processes. The structure in accordance with the invention of the microvalve can also be advantageously created by means of LIGA technology from plastic or metals. A segment of the layer 3 has been cut out in FIG. 1, so that there is a top view of layer 2. The structure of the microvalve is completely symmetrical, so that the first layer 1 and the third layer 3, which constitute the stator levels of the microvalve, are identically structured. In this example there are two return connectors T1, T2 (T1', T2') as well as two working connectors A, B (A', B') and a feed connector P (P') embodied in the first layer 1 and thus also in the third layer 3. In this example the connectors are embodied as pipe-like conduits extending parallel to the layer levels and are entirely located in the first layer 1 and the third layer 3. The conduits of the connectors have connecting openings to the second layer 2 only in a central area, which is located opposite of a flat slider with flow-through openings 24 and 25 embodied in the second layer. This structure of the layers 1 and 3 can be achieved, for example, by constructing the layers 1 and 3 from a plurality of sub-layers.

Another embodiment of the connectors consists in cutting the connectors as flow-through openings vertically in respect to the layer levels in the first layer 1 and the third layer 3. Because the section through the third layer 3 is located in the area of the flat slider, the connector conduits with the connecting openings are shown in profile. The slider element embodied in the second layer is partially obscured. One of the transverse beams has been designated by the reference numeral 22 and the flat slider with the second layer is fastened on it. An electrode 272 constituting a portion of the drive means of the valve and fixed on the surface of the flat slider is also shown.

Figure 2:
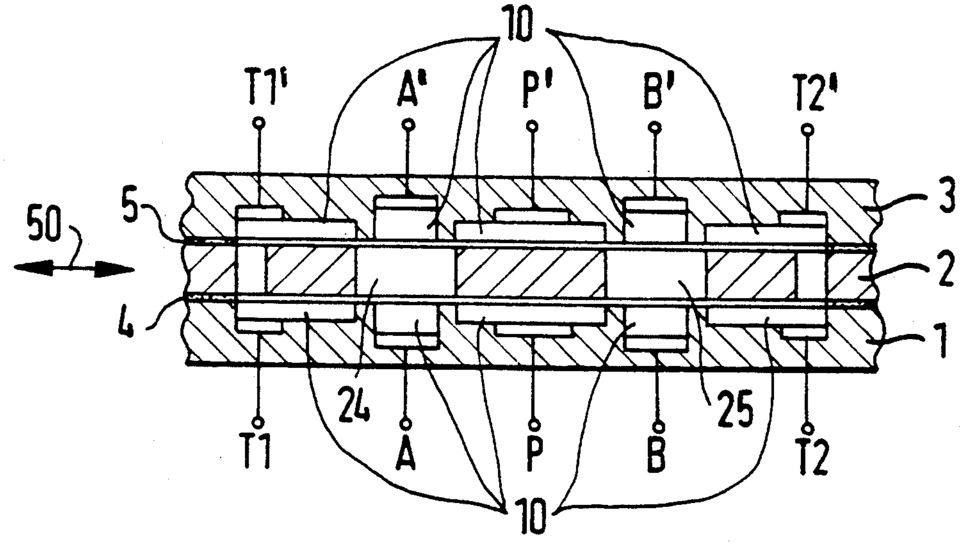
FIG. 2 is a sectional view of a microvalve.

A sectional view of the multi-layer structure of the microvalve in the area of the flat slider is shown in FIG. 2. The two stator levels 1 and 3 are connected via intermediate layers 4 and 5 with the slider level 2. The intermediate layers 4 and 5 are structured in such a way that they have recesses in the area of the flat slider and the transverse beams, so that the flat slider can be displaced in the direction of movement indicated by the arrow 50. The conduits forming the connectors T, T', A, A', P, P', B, B', T2, T2', which extend parallel to the layer levels, are shown in FIG. 2 with the connecting openings 10 in the direction of the second layer 2. The flat slider with the two flow-through openings 24 and 25 is shown in a first position, which can be the rest position, for example, i.e. it can be that position in which the drive means of the flat slider are not operated. In this position each of the oppositely located working connectors A and A' as well as B and B' are connected with each other via the flow-through openings 24 and 25. In this case, because of the particular design of the flat slider and the disposition of the connectors, no connection of the working connectors A, A', B and B' to a return connector T1, T1', T2, T2' or a feed connector P, P' is provided.

When displacing the flat slider, it is possible to provide a connection of the working connectors A' and A with the return connectors T1 and T1', for example, while the working connectors B and B' are connected with the feed connectors P and P'. In the course of the displacement of the flat slider out of the rest position in the other direction, it is correspondingly possible to connect the working connectors B and B' with the return connectors T2 and T2', while the working connectors A and A' are connected with the feed connectors P and P'. Thus the flat slider of the microvalve illustrated here can take up three different positions and has four different connections, which corresponds to a $\frac{3}{4}$-way valve.

Figure 3:
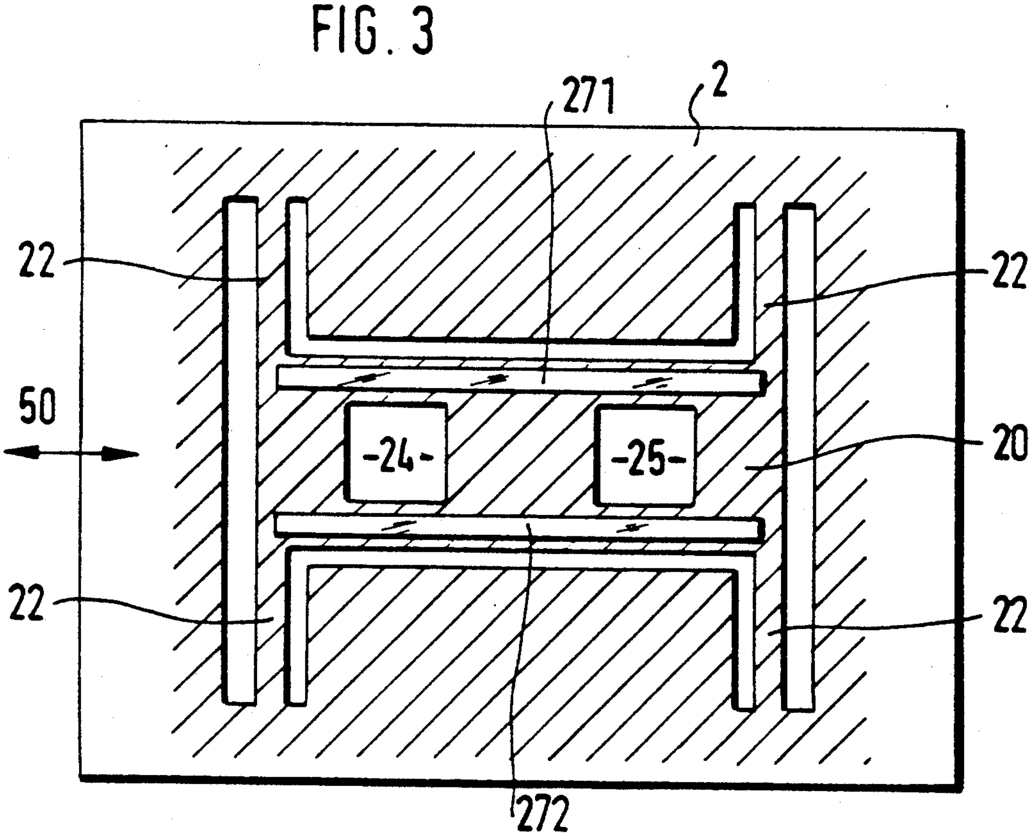
FIG. 3 is a top view of the slider level of a microvalve.

A top view of the second layer 2, the slider level, is shown in FIG. 3. A flat slider 20 with two flow-through openings 24 and 25 has been structured out of the second layer 2. The flat slider 20 is connected with the second layer 2 via transverse beams 22. Additionally, electrodes 271 and 272 are disposed on the surface of the flat slider. Depending on the design of the transverse beams 22, i.e. depending on the number of transverse beams 22 and the orientation of the transverse beams 22 in respect to their preferred displacement direction, and depending on the disposition of the electrodes 271, 272 on the flat slider 20 and the disposition of the counter-electrodes on the surfaces of the first layer 1 and the third layer 3 facing the second layer 2, the flat slider 20 can be displaced in one or a plurality of directions. In the exemplary embodiment shown in FIG. 3, the flat slider 20 is displaced in the direction indicated by the arrow 50.

Figure 4B:
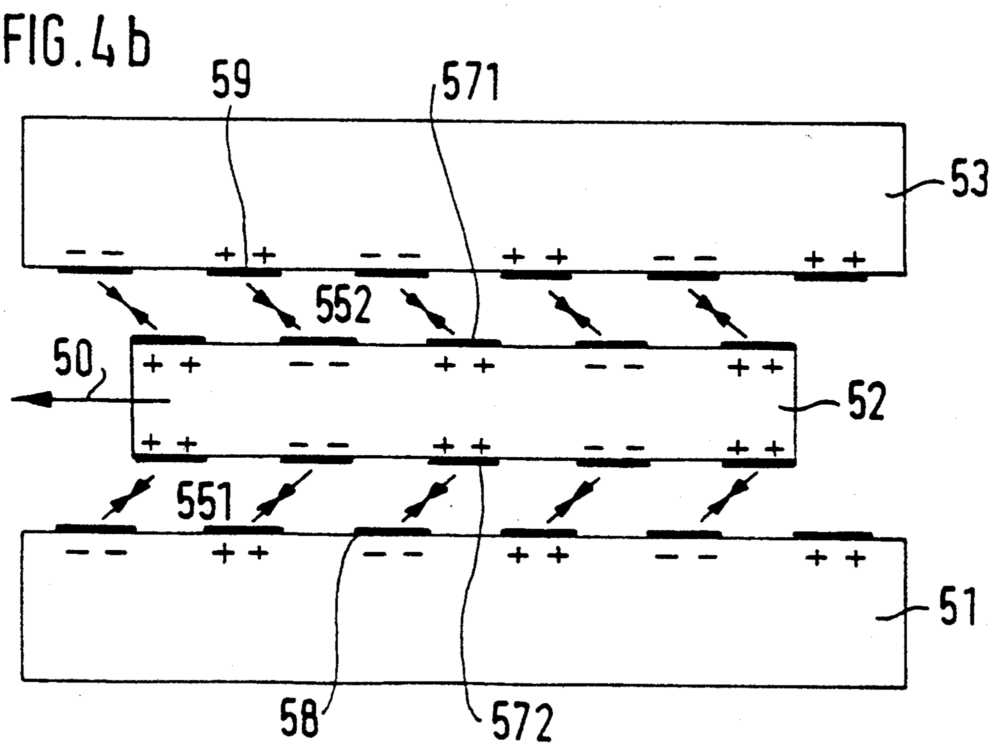

The principle of the electrostatic drive is shown in FIGS. 4*a* and *b*. The arrow 50 indicates the desired movement direction of the slider 52. Electrodes 551 and 552 each have been placed on the two surfaces of the slider 52 in FIG. 4*a*. Counter-electrodes 581, 582 and 591, 591 are disposed, spatially phase-shifted in respect to the electrodes 551 and 552, on the opposite walls 51 and 53 of the housing. Depending on the desired movement direction, a voltage can be applied either between the electrodes 551 and 552 and the counter-electrodes 581 and 591, or between the electrodes 551 and 552 and the counter-electrodes 582 and 592. With a symmetrical disposition of the counter-electrodes in respect to the electrodes, the vertical components of the forces cancel each other out in this case; only the horizontal components of the forces remain, which cause displacement of the slider 52 in the layer level. In the variant shown in FIG. 4*b*, a plurality of electrodes 571 and 572, as well as a plurality of counter-electrodes 58 and 59 are applied to the surfaces of the slider 52 and the housing 51, 53. However, the mode of functioning of this arrangement corresponds to the one shown in FIG. 4*a*.

Various changes and modifications are possible within the scope of the inventive concept, and features of one embodiment may be combined with features of another embodiment.

We claim:

1. A microvalve with a multi-layer structure for regulating or controlling fluid flows with a first layer, in which at least one feed connector and at least a first return connector is structured, and with a second layer which is connected via an at least first structured intermediate layer with the first layer, where means are structured in the second layer which are electrostatically operable, because of which the degree of opening of the at least one feed connector can be changed, characterized in that at least two working connectors (A, B) and at least a second return connector (T2) are structured in the first layer (1), the microvalve is formed symmetrically in respect to the second layer (2), in that a third layer (3), structured mirror-reversed in respect to the first layer (1), is applied to the second layer (2) via a further structured intermediate layer (5), having at least two further working connectors (A', B') and at least a further feed connector (P'), where each of two connectors located opposite each other in the first layer (1) and the second layer (2) form a pair, and at least one flat slider (20), displaceable in the layer level and having at least two flow-through openings (24, 25) is structured in the second layer (2) as an electrostatically operable means.

2. A microvalve in accordance with claim 1, characterized in that the working connectors (A, A', B, B'), the feed connectors (P, P') and the return connectors (T, T') are formed as flow-through openings in at least one of the first layer (1) and the third layer (3).

3. A microvalve in accordance with claim 1, characterized in that the working connectors (A, A', B, B'), the feed connectors (P,P') and the return connectors (T,T') are formed as tubular channels, parallel to surfaces of said layers, in said first and third layers, and are formed with connecting openings (10) to said second layer only adjacent flow-through openings (24, 25) of said flat slider (20).

4. A microvalve in accordance with claim 1, characterized in that the flat slider (20) is connected with the second layer (2) at at least one transverse beam (22).

5. A microvalve in accordance with claim 4, characterized in that the first structured intermediate layer (4) and the second structured intermediate layer (5) have recesses in the areas of the flat slider (20) and the transverse beams (22).

6. A microvalve in accordance with claim 1, characterized in that the second layer (2) is reduced in thickness in the areas of the flat slider (20); and the transverse beams (22), the first layer (1), and the third layer (3) are reduced in thickness on the surfaces facing the second layer (2) in the areas of the flat slider (20) and the transverse beams (22).

7. A microvalve in accordance with claim 1, characterized in that in a first position of the flat slide (20) the at least two flow-through openings (24, 25) each provide a connection between the working connectors (A, A', B, B') forming a pair, without there being a connection of the working connectors (A, A', B, B') with the feed connectors (P, P') or the return connectors (T1, T1', T2, T2'), and in at least two further positions of the flat slider (20) the at least two flow-through openings (24, 25) provide a connection between a pair of working connectors (A, A'; B, B') and the at least one pair of feed connectors (P, P') and a connection between another pair of working connectors (B, B'; A, A') and a pair of return connectors (T1, T1'; T2, T2').

8. A microvalve in accordance with claim 1, characterized in that the first position of the flat slider (20) is the rest position of the microvalve.

9. A microvalve in accordance with claim 1, characterized in that at least one electrode (571, 572) is disposed on each one of the top and underside of the flat slider (20) and of the transverse beams (22), on the surfaces of the first layer (1) and the third layer (3), facing the second layer (2), counter-electrodes (581, 582, 591, 592) are disposed, offset in the displacement direction with respect to the electrodes (571, 572) applied to the flat slider (20), and there are means for applying a voltage, between the electrodes (571, 572) on the flat slider (20) and the counter-electrodes (581, 582, 591, 592), on the first layer (1) and the third layer (3).

10. A microvalve in accordance with claim 9, characterized in that the electrodes (572) on the top of the flat slider (20) are disposed symmetrically in relation to the electrodes (573) on the underside of the flat slider (20), and that the counter-electrodes (58, 581, 582) on the first layer (1) are disposed symmetrically in relation to the counter-electrodes (59, 591, 592) on the third layer (3).

11. A microvalve in accordance with claim 9, characterized in that the electrodes (571, 572) and the counter-electrodes (581, 582, 591, 592) are realized as thin metallic layers.

12. A microvalve in accordance with claim 1, characterized in that the structures of the layers (1, 2, 3) of the microvalve construction are transferred by the lithographic structure transfer method in the batch process to a suitable layer material, preferably silicon or glass, and the layers are bonded to each other.

13. A microvalve in accordance with claim 9, characterized in that the electrodes (571, 572) and the counter-electrodes (581, 582, 591, 592) are realized as doped silicon layers.

* * * * *